(12) United States Patent
Kim et al.

(10) Patent No.: US 11,328,710 B2
(45) Date of Patent: May 10, 2022

(54) DIALOGUE PROCESSING APPARATUS, DIALOGUE PROCESSING SYSTEM INCLUDING THE SAME, AND DIALOGUE PROCESSING METHOD

(71) Applicants: HYUNDAI MOTOR COMPANY, Seoul (KR); KIA MOTORS CORPORATION, Seoul (KR)

(72) Inventors: Seona Kim, Seoul (KR); Youngmin Park, Gunpo-si (KR); Jeong-Eom Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 73 days.

(21) Appl. No.: 16/842,244

(22) Filed: Apr. 7, 2020

(65) Prior Publication Data
US 2021/0142787 A1 May 13, 2021

(30) Foreign Application Priority Data
Nov. 7, 2019 (KR) .................. 10-2019-0141889

(51) Int. Cl.
*G10L 15/08* (2006.01)
(52) U.S. Cl.
CPC .................. *G10L 15/08* (2013.01)
(58) Field of Classification Search
CPC ... G10L 15/00; G10L 15/22; G10L 2015/228; G10L 15/187; G10L 2015/063; H04M 1/271; H04M 2250/74; B60R 16/0373

USPC .......... 704/231–235, 200, 270–275
See application file for complete search history.

(56) References Cited

U.S. PATENT DOCUMENTS

| 2016/0133248 | A1* | 5/2016 | Bouk ..................... G10L 15/22 704/8 |
| 2018/0225086 | A1* | 8/2018 | Hollander ............... G10L 15/22 |
| 2018/0242219 | A1* | 8/2018 | Deluca ................ H04L 65/1059 |
| 2019/0035398 | A1* | 1/2019 | Choi ....................... G10L 15/22 |
| 2019/0371328 | A1* | 12/2019 | Wang ..................... G06F 3/167 |

FOREIGN PATENT DOCUMENTS

KR          20170093629 A          8/2017

* cited by examiner

*Primary Examiner* — Andrew M Moyer
*Assistant Examiner* — Stephen M Brinich
(74) *Attorney, Agent, or Firm* — Lempia Summerfield Katz LLC

(57) ABSTRACT

A dialogue processing apparatus includes: a communicator configured to communicate with an external apparatus; a speech inputter configured to receive a speech of a user; and a controller configured, when the speech of the user is received, to determine whether it is possible to provide a function corresponding to the received speech, and to control the communicator to transmit speech information about the speech of the user to the external apparatus based on whether it is possible to provide the function corresponding to the received speech.

21 Claims, 6 Drawing Sheets

DIALOGUE PROCESSING APPARATUS, DIALOGUE PROCESSING SYSTEM INCLUDING THE SAME, AND DIALOGUE PROCESSING METHOD

CROSS-REFERENCE TO RELATED APPLICATION(S)

This application is based on and claims priority under 35 U.S.C. § 119 to Korean Patent Application No. 10-2019-0141889, filed on Nov. 7, 2019 in the Korean Intellectual Property Office, the disclosure of which is incorporated by reference in its entirety.

TECHNICAL FIELD

The disclosure relates to a dialogue processing apparatus that identifies a user's intention through a dialogue with a user and that provides information or service needed by the user, a dialogue processing system including the same and a dialogue processing method.

BACKGROUND

A dialogue processing apparatus is an apparatus that performs a dialogue with a user. The dialogue processing apparatus may recognize the user's speech, identify the user's intention through a speech recognition result, and output a response for providing the user with necessary information or service.

On the other hand, most dialogue processing apparatuses support different services. For example, smart phones support a call service and the like, and home appliances such as smart TVs provide a different service for each apparatus, such as a service for broadcast contents or video contents. In this case, it is inconvenient for the user to change the service request method according to the dialogue processing apparatus to be used.

SUMMARY

Therefore, it is an aspect of the disclosure to provide a dialogue processing apparatus capable of recognizing a user's speech and of outputting a response corresponding to the user's speech, a dialogue processing system including the same and a dialogue processing method.

Additional aspects of the disclosure are set forth below in part in the description which follows and, in part, should be obvious from the description or may be learned by practice of the disclosure.

In accordance with an aspect of the disclosure, a dialogue processing apparatus includes: a communicator configured to communicate with an external apparatus; a speech inputter configured to receive a speech of a user; and a controller configured, when the speech of the user is received, to determine whether it is possible to provide a function corresponding to the received speech, and to control the communicator to transmit speech information about the speech of the user to the external apparatus based on whether it is possible to provide the function corresponding to the received speech.

When it is impossible to provide the function corresponding to the received speech, the controller may be configured to control the communicator to transmit the speech information about the speech of the user to the external apparatus, and to store the speech information in the external apparatus.

The speech information may include sound data for the speech of the user, a speech recognition result for the speech of the user, and context information.

When it is impossible to provide the function corresponding to the received speech, the controller may be configured to control the communicator to transmit a cooperative request signal to the external apparatus.

When a cooperative response signal corresponding to the cooperative request signal is received, the controller may be configured to control the communicator to transmit the speech information to the external apparatus that transmitted the cooperative response signal.

When the cooperative response signal is received from the at least one external apparatus, the controller may be configured to select an apparatus for outputting a response corresponding to the speech of the user among the at least one external apparatus that transmits the cooperative response signal, and to transmit an approval signal related to the output of a response corresponding to a speech signal to the selected apparatus.

The controller may be configured to select an apparatus capable of first providing a function corresponding to the speech information among the at least one external apparatus that transmits the cooperative response signal as an apparatus for outputting a response corresponding to the speech of the user. The controller may be configured to control the selected apparatus such that the selected apparatus outputs the response corresponding to the speech information and deletes the speech information.

The controller may be configured to select an apparatus for outputting the response corresponding to the speech of the user among the at least one external apparatus that transmits the cooperative response signal, based on at least one of a dialogue processing speed, accuracy, user preference, frequency of use, reception order of the cooperative response signal, or a predetermined priority.

The dialogue processing apparatus may further include an output unit. The controller may be configured to, when it is possible to provide the function corresponding to the received speech, generate the response corresponding to the speech of the user and control the output unit to output the generated response. When the generated response is output, the controller may be configured to transmit a deletion request for the speech information to the external apparatus.

The controller may be configured to transmit a deletion request for the speech information to the external apparatus when the generated response is output.

In accordance with another aspect of the disclosure, a server includes: a server communicator configured to communicate with at least one dialogue processing apparatus; a server storage; and a server controller configured to, when speech information about the speech of the user is received from the at least one dialogue processing apparatus, store the received speech information in the server storage; and when a deletion request for the speech information is received from the at least one dialogue processing apparatus, delete the speech information stored in the server storage.

The server controller may be configured to control the server communicator to transmit a notification message for the speech information to the at least one dialogue processing apparatus when the speech information is received.

In accordance with another aspect of the disclosure, a dialogue processing system includes a server configured to communicate with at least one external apparatus. The dialogue processing system includes a first dialogue processing apparatus configured to receive a speech of a user, identify an intention of the user corresponding to the received speech, determine whether it is possible to provide a function corresponding to the intention of the user, and register speech information about the speech of the user with the server based on whether it is possible to provide a function corresponding to the received speech. The dialogue processing system includes a second dialogue processing apparatus configured to, when the speech information is registered in the server, determine whether it is possible to provide a function corresponding to the intention of the user, and generate a response corresponding to the speech information based on whether it is possible to provide the function corresponding to the intention of the user and output the generated response.

When it is impossible to provide a function corresponding to the received speech, the first dialogue processing apparatus may be configured to transmit speech information about the speech of the user to the server. The server may be configured to register the speech information by storing the speech information received from the first dialogue processing apparatus.

When the function corresponding to the intention of the user is provided, the second dialogue processing apparatus may be configured to generate a response corresponding to the speech information, and to output the generated response.

When the generated response is output, the second dialogue processing apparatus may be configured to transmit a deletion request of the speech information to the server. The server may be configured to delete the stored speech information based on the deletion request.

The speech information may include at least one of sound signal data corresponding to the speech of the user and a speech recognition result generated by the first dialogue processing apparatus.

When it is impossible to provide the function corresponding to the received speech, the first dialogue processing apparatus may be configured to control the communicator to transmit a cooperative request signal to the external apparatus.

When a cooperative response signal corresponding to the cooperative request signal is received from at least one external apparatus, the first dialogue processing apparatus may be configured to select an apparatus for outputting a response corresponding to the speech of the user among the at least one external apparatus that transmits the cooperative response signal, and to transmit an approval signal related to the output of a response corresponding to a speech signal to the selected apparatus.

When an apparatus capable of first providing a function corresponding to the speech information among the at least one external apparatus that transmits a cooperative response signal corresponding to the cooperative request signal is the second dialogue processing apparatus, the first dialogue processing apparatus may be configured to select the second dialogue processing apparatus as an apparatus for outputting a response corresponding to the speech of the user. The second dialogue processing apparatus may be configured to output the response corresponding to the speech information, and to delete the speech information from the server.

The first dialogue processing apparatus may be configured to select an apparatus for outputting the response corresponding to the speech of the user among the at least one external apparatus that transmits the cooperative response signal, based on at least one of dialogue processing speed, accuracy, user preference, frequency of use, reception order of the cooperative response signal, or a predetermined priority.

The second dialogue processing apparatus may be configured to compare position information of the first dialogue processing apparatus with position information of the second dialogue processing apparatus. The second dialogue processing apparatus may be configured to transmit a dialogue response among the generated responses to the first dialogue processing apparatus based on the comparison result.

In accordance with another aspect of the disclosure, a dialogue processing method includes: receiving a speech of a user through a first dialogue processing apparatus; identifying, by the first dialogue processing apparatus, the intention of the user corresponding to the received speech and determining whether it is possible to provide a function corresponding to the intention of the user by the first dialogue processing apparatus; registering, by the first dialogue processing apparatus, speech information about the speech of the user with the server based on whether it is possible to provide a function corresponding to the received speech by the first dialogue processing apparatus; when the speech information is registered in the server, generating, by a second dialogue processing apparatus, a response corresponding to the speech information based on whether it is possible to provide a function corresponding to the speech information; and outputting, by the second dialogue processing apparatus, the generated response.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Like reference numerals refer to like elements throughout the specification. Not all elements of the embodiments of the disclosure are described. Description of what are commonly known in the art or what overlap each other in the embodiments has been omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It should be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It should be understood that, although the terms first, second, third, and the like, may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Throughout the specification, the term "inputter" may refer to an input unit and the term "outputter" may refer to an output unit.

The principle and embodiments of the disclosure are described below with reference to the accompanying drawings.

Figure 1:
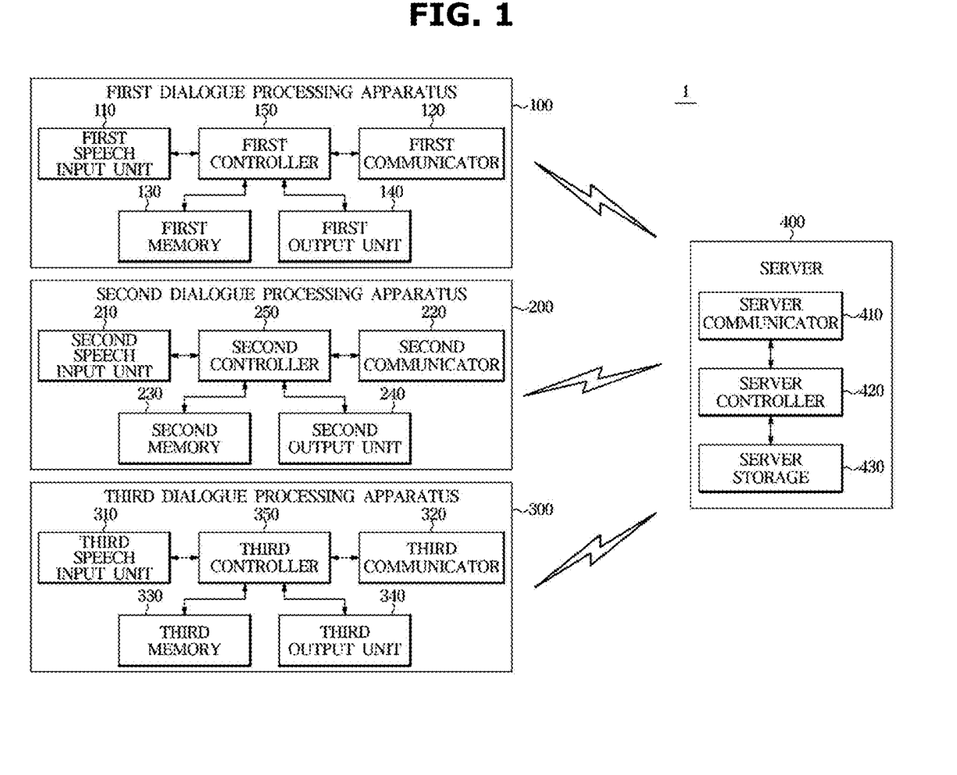
FIG. 1 is a control block diagram of a dialogue processing system according to an embodiment of the disclosure.

FIG. 1 is a control block diagram of a dialogue processing system according to an embodiment of the disclosure.

Referring to FIG. 1, a dialogue processing system 1 according to an embodiment may include a first dialogue processing apparatus 100, a second dialogue processing apparatus 200, a third dialogue processing apparatus 300, and a server 400.

Each of the first dialogue processing apparatus 100, the second dialogue processing apparatus 200, and the third dialogue processing apparatus 300 may communicate with each other and may communicate with the server 400.

The first dialogue processing apparatus 100, the second dialogue processing apparatus 200, the third dialogue processing apparatus 300, and the server 400 may share information for providing an appropriate response to a user by transmitting and receiving various information for dialogue processing.

The first dialogue processing apparatus 100 may include a first speech inputter 110, a first communicator 120, a first memory 130, a first outputter 140, and a first controller 150.

The first speech inputter 110 may receive the user's speech. The first speech inputter 110 may include a microphone that receives sound and converts the sound into an electrical signal.

The first communicator 120 may communicate with an external apparatus. In this case, the external apparatus may include at least one of the second dialogue processing apparatus 200, the third dialogue processing apparatus 300, and the server 400. In addition, the first communicator 120 may include various apparatuses such as a user terminal.

The first communicator 120 may transmit and receive various information for dialogue processing of the dialogue processing system 1.

To this end, the first communicator 120 may include one or more components that enable communication with the external apparatus, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The wireless communication module may include a wireless communication interface including an antenna and a transmitter for transmitting various signals used in the dialogue processing system 1. In addition, the wireless communication module may further include a signal converting module for converting a digital control signal output from the first controller 150 through the wireless communication interface into an analog type wireless signal under the control of the first controller 150.

The wireless communication module may include the wireless communication interface including the antenna and a receiver for receiving various signals used in the dialogue processing system 1. In addition, the wireless communication module may further include the signal converting module for demodulating an analog type wireless signal received through the wireless communication interface into a digital control signal.

The first memory 130 may store various information used in the first dialogue processing apparatus 100. In addition, the first memory 130 may store various information used in the dialogue processing system 1.

To this end, the first memory 130 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto. The first memory 130 may be a memory implemented with a chip separate from a processor, which is described below in relation to the first controller 150. The first memory 130 may be implemented integrally with the processor in a single chip.

The first outputter 140 may visually or audibly output a response corresponding to the user's speech. To this end, the first outputter 140 may include at least one of a speaker for outputting a response corresponding to the voice of the user as a sound or a display for outputting a response corresponding to the voice of the user as an image or text.

The first controller 150 may perform overall control of at least one configuration of the first dialogue processing apparatus 100.

The first controller 150 may recognize the user's speech input from the first speech inputter 110 and convert the user's speech into a text-type utterance. The first controller 150 may apply a natural language understanding algorithm to the utterance text to determine the intention of the user or a dialogue partner. At this time, the intention of the user or the dialogue partner identified by the first controller 150 may include a dialogue topic or a call topic identified based on the utterance text.

To this end, the first controller 150 may include a voice recognition module and may be implemented as a processor that performs an operation for processing an input voice.

When the user's speech is received, the first controller 150 may determine whether it is possible to provide a function corresponding to the received speech, and output a response corresponding to the user's speech based on whether it is possible to provide the function corresponding to the received speech.

In detail, the first controller 150 may generate the speech recognition result by recognizing the speech received from the user. In this case, the speech recognition result may include at least one of the utterance text, the intention of the user or the dialogue partner. The user's intention may include the dialogue topic or the call topic corresponding to the utterance text.

The first controller 150 may determine the user's intention based on the speech recognition result and may determine whether it is possible to provide the function corresponding to the user's intention.

Particularly, the first controller 150 may determine the function corresponding to the user's intention and may determine whether the function may be provided by comparing the function corresponding to the user's intention with pre-stored information that can be provided.

In this case, the function information that can be provided may refer to information related to a function of a service content associated with the first dialogue processing apparatus 100. The function information that can be provided may be stored in advance in the first memory 130 and may be received from the external apparatus including the server 400.

When it is possible to provide the function corresponding to the user's intention, i.e., when the function corresponding to the user's intention corresponds to the pre-stored information that can be provided, the first controller 150 may generate a response corresponding to the user's intention.

At this time, the response output in response to the user's speech may include a dialogue response, an associated service function, and the like. The dialogue response may be in the form of an initial dialogue, a query, or an answer that includes informational provision.

The first controller 150 may control the first outputter 140 to output the generated response.

On the other hand, when it is impossible to provide the function corresponding to the user's intention in the first dialogue processing apparatus 100, i.e., the function corresponding to the user's intention is not included in the pre-stored information that can be provided, a case in which the user cannot provide a desired function may occur.

Therefore, when the provision of the function corresponding to the user's intention is not possible in a specific dialogue processing apparatus, a system for providing the function desired by the user by another dialogue processing apparatus is required.

To this end, the first controller 150 may transmit speech information to the external apparatus. For example, the first controller 150 may transmit the speech information to the server 400.

In this case, the speech information may include at least one of sound data for the user's speech, the speech recognition result for the user's speech, or context information.

For example, the sound data for user's speech may include speech recording data for user's speech. The speech recognition result for the user's speech may include at least one of the utterance text corresponding to the user's speech or the user's intention derived based on the user's speech.

The context information may refer to information for understanding a situation related to the user's speech and information for more accurately identifying the user's intention. For example, the context information may include information about a place where the user utters. In addition, the context information may further include user information about the characteristics of the user.

In addition, the context information may include not only the situation at the time of the user utters but also information for understanding the situation during a predetermined period from a time point when the user utters.

When the provision of the function corresponding to the user's speech is not possible in the first dialogue processing apparatus 100, the first controller 150 may transmit the speech information for the corresponding user's speech to the external apparatus including the server 400 so as to provide the function desired by the user by another dialogue processing apparatus. A detailed description thereof is described below.

The first controller 150 may be implemented with the memory storing an algorithm to control operation of the components in the first dialogue processing apparatus 100 or data about a program that implements the algorithm, and the processor carrying out the aforementioned operation using the data stored in the memory. The memory and the processor may be implemented in separate chips. Alternatively, the memory and the processor may be implemented in a single chip.

The second dialogue processing apparatus 200 may include a second speech inputter 210, a second communicator 220, a second memory 230, a second outputter 240, and a second controller 250. Each configuration of the second dialogue processing apparatus 200 may be equally applicable to the description of each configuration of the first dialogue processing apparatus 200 described above.

However, unlike the first controller 150, the second controller 250 may identify whether the speech information is registered in the server 400. When the speech information is registered, the second controller 250 may control the second communicator 220 to receive the speech information from the server 400. The second controller 250 may identify whether the function corresponding to the user's speech can be provided based on the received speech information. When it is possible to provide the function corresponding to the user's speech, the second controller 250 may generate the response based on the speech information and may control the second outputter 240 to output the generated response.

The third dialogue processing apparatus 300 may include a third speech inputter 310, a third communicator 320, a third memory 330, a third outputter 340, and a third controller 350. Each configuration of the third dialogue processing apparatus 300 may be equally applicable to the description of each configuration of the first dialogue processing apparatus 200 described above.

However, unlike the first controller 150, the third controller 350 may identify whether the speech information is registered in the server 400. When the speech information is registered, the third controller 350 may control the third communicator 320 to receive the speech information from the server 400. The third controller 350 may identify whether the function corresponding to the user's speech can be provided based on the received speech information. When it is possible to provide the function corresponding to the user's speech, the third controller 350 may generate the response based on the speech information and may control the third outputter 340 to output the generated response.

Each of the plurality of dialogue processing apparatuses 100, 200, and 300 described above may provide different functions. At this time, the information that can be provided stored in each of the memories 130, 230, 330 of the plurality of dialogue processing apparatuses 100, 200, and 300 may be different for each apparatus.

In addition to the above-described configuration, each of the first dialogue processing apparatus 100, the second dialogue processing apparatus 200, and the third dialogue processing apparatus 300 may further include an inputter, i.e., an input unit. In this case, the inputter may receive an operation command from the user. The user may issue an operation command to each of the first dialogue processing apparatus 100, the second dialogue processing apparatus 200, and the third dialogue processing apparatus 300 by pressing a button. Each of the dialogue processing apparatuses 100, 200, and 300 may activate the internal components to recognize the user's speech when the operation command is received from the user.

To this end, the inputter may include hardware devices such as various buttons or switches, pedals, keyboards, mice, track-balls, various levers, handles, sticks, or the like for user input.

In addition, the inputter may include a graphical user interface (GUI) such as a touch pad for user input, that is, a software device. The touch pad may be implemented as a touch screen panel (TSP) to form a mutual layer structure with the display. When the TSP forms the mutual layer structure with the touch pad, the display may also be used as the inputter.

The server 400 may include a server communicator 410, a server storage 430, and a server controller 420.

The server communicator 410 may communicate with the external apparatus and share various information used in the dialogue processing system 1 with the external apparatus. To this end, the server communicator 410 may include one or more components that enable communication with the external apparatus, i.e., at least one of the short-range communication module, the wired communication module, and the wireless communication module.

The server storage 430 may store information received from the external apparatus. The information stored in the server storage 430 may be viewed by the external apparatus. In other words, the information stored in the server storage 430 may be shared with the external apparatus that is communicatively connected to the server communicator 410.

To this end, the server storage 430 may be implemented as at least one of a non-volatile memory device, a volatile memory device, and a storage medium, but is not limited thereto. The server storage 430 may be a memory implemented as a chip separate from a processor to be described below with respect to the server controller 420 or may be implemented as a single chip with the processor.

The server controller 420 may perform overall control of at least one configuration of the server 400.

When the server controller 420 receives the speech information about the user's speech from the at least one dialogue processing apparatus 100, 200, or 300, the server controller 420 may register the speech information by storing the speech information in the server storage 430.

In addition, the server controller 420 may delete the stored speech information when receiving a deletion request for the speech information about the user's speech from the at least one dialogue processing apparatus 100, 200, or 300.

When the server controller 420 receives the speech information, the server controller 420 may control the server communicator 410 to transmit a notification message for the speech information to the external apparatus. At this time, the notification message for the speech information may be a message indicating the registration of the speech information. When the speech information is stored in the server storage 430, the server controller 420 may transmit the notification message for registering the speech information to the external apparatus.

In addition, the server controller 420 may control the server communicator 410 to transmit various messages to the external apparatus.

At least one component may be added or deleted corresponding to the performance of the components of the dialogue processing system 1, the first dialogue processing apparatus 100, the second dialogue processing apparatus 200, the third dialogue processing apparatus 300, and the server 400 illustrated in FIG. 1. It should be readily understood by a person of ordinary skill in the art that the relative positions of the components may be changed corresponding to the performance or structure of the system.

Each of the components illustrated in FIG. 1 may refer to a software component and/or a hardware component such as a Field Programmable Gate Array (FPGA) and an Application Specific Integrated Circuit (ASIC).

Figure 2:
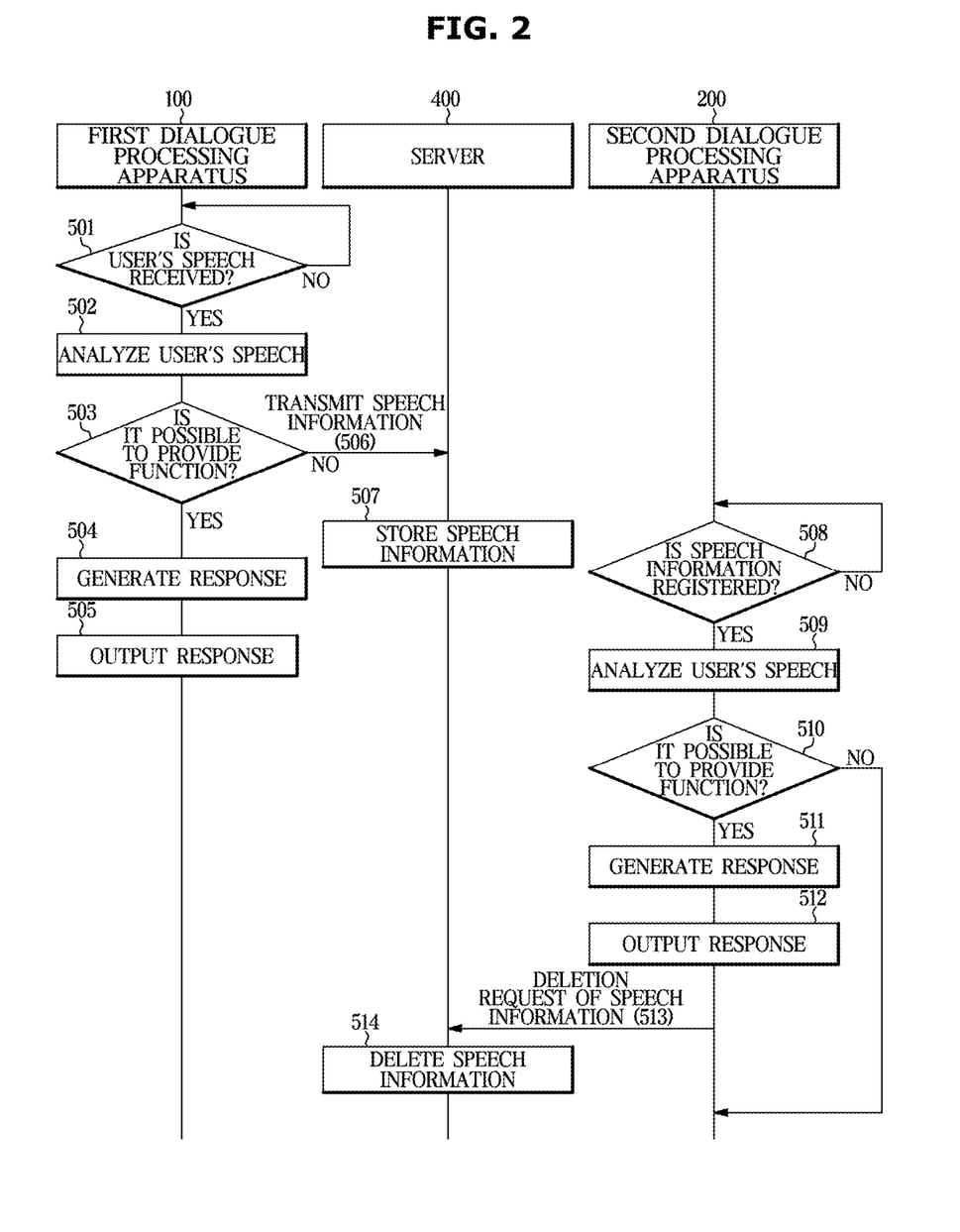
FIG. 2 is a flowchart illustrating a dialogue processing method of a dialogue processing system according to an embodiment of the disclosure.

FIG. 2 is a flowchart illustrating a dialogue processing method of a dialogue processing system according to an embodiment of the disclosure.

Referring to FIG. 2, the dialogue processing system 1 according to an embodiment may include the first dialogue processing apparatus 100, the second dialogue processing apparatus 200, and the server 400.

The first controller 150 of the first dialogue processing apparatus 100 may determine whether the user's speech is received (501).

When the users speech is received through the first speech inputter 110 (YES in 501), the first controller 150 may analyze the user's speech (502). In detail, the first controller 150 may recognize the user's speech and generate the speech recognition result including at least one of the utterance text corresponding to the user's speech or the user's intention.

The first controller 150 may determine whether it is possible to provide the function corresponding to the user's intention (503). In detail, the first controller 150 may determine the function corresponding to the user's intention and determine whether it is possible to provide the corresponding function by comparing the function corresponding to the user's intention with pre-stored function information that can be provided. In this case, the function information that can be provided may refer to information related to the function of the service content associated with the first dialogue processing apparatus 100. The function information that can be provided may be stored in advance in the first memory 130 and may be received from the external apparatus including the server 400 or the like.

When it is possible to provide the function corresponding to the user's intention (YES in 503), the first controller 150 may generate the response corresponding to the user's intention (504) and output the generated response (505).

In another example, when it is impossible to provide the function corresponding to the user's intention (NO in 503), the first controller 150 may transmit the speech information about the user's speech to the server 400 (506).

In this case, the speech information may include at least one of the sound data for the user's speech, the speech recognition result for the user's speech, or the context information.

For example, the sound data for the user's speech may include the speech recording data for the user's speech. The speech recognition result for the user's speech may include at least one of the utterance text corresponding to the user's speech or the user's intention derived based on the user's speech.

The context information may refer to information for understanding the situation related to the user's speech and information for more accurately identifying the user's intention. For example, the context information may include the information about the place where the user utters. In addition, the context information may further include the user information about the characteristics of the user.

In addition, the context information may include not only the situation at the time when the user utters but also the information for understanding the situation during the predetermined period from the point in time when the user utters.

The server controller 420 may store the received speech information (507). In other words, the server controller 420 may register the speech information to the server storage 430.

The second controller 250 of the second dialogue processing apparatus 200 connected to the server 400 may identify whether the speech information is stored in the server 400, in other words, whether or not the speech information is registered (508). At this time, whether the speech information is registered or not may be performed based on a real time or the predetermined period or may be performed based on the notification message received from the server 400.

When the speech information is registered in the server 400 (YES in 508), the second controller 250 may analyze the user speech (509). In detail, the second controller 250 may recognize the user's speech based on the received speech information and may identify the user's intention corresponding to the speech information.

The second controller 250 may determine whether it is possible to provide the function corresponding to the user's intention (510). In detail, the second controller 250 may determine the function corresponding to the user's intention and determine whether it is possible to provide the corresponding function by comparing the function corresponding to the user's intention with pre-stored function information that can be provided. In this case, the function information that can be provided may refer to information related to the function of the service content associated with the second dialogue processing apparatus 200. The function information that can be provided may be stored in advance in the second memory 230 and may be received from the external apparatus including the server 400 or the like.

When it is possible to provide the function corresponding to the user's intention (YES in 510), the second controller 250 may generate the response corresponding to the user's intention (511) and output the generated response (512).

When the generated response is output, the second controller 250 may transmit a speech information deletion request to the server 400 (513), and the server 400 may delete the stored speech information (514).

Through this, even when the function corresponding to the user's speech cannot be provided by the dialogue processing apparatus receiving the user's speech, the user may be provided with a desired service through another dialogue processing apparatus capable of providing the corresponding function. Therefore, user's convenience may be improved, and an efficient dialogue service may be provided.

In addition, since the user can be provided with the desired service without having to give a different command by changing a call word for each dialogue processing apparatus, satisfaction with the dialogue processing system 1 can be increased.

Figure 3:
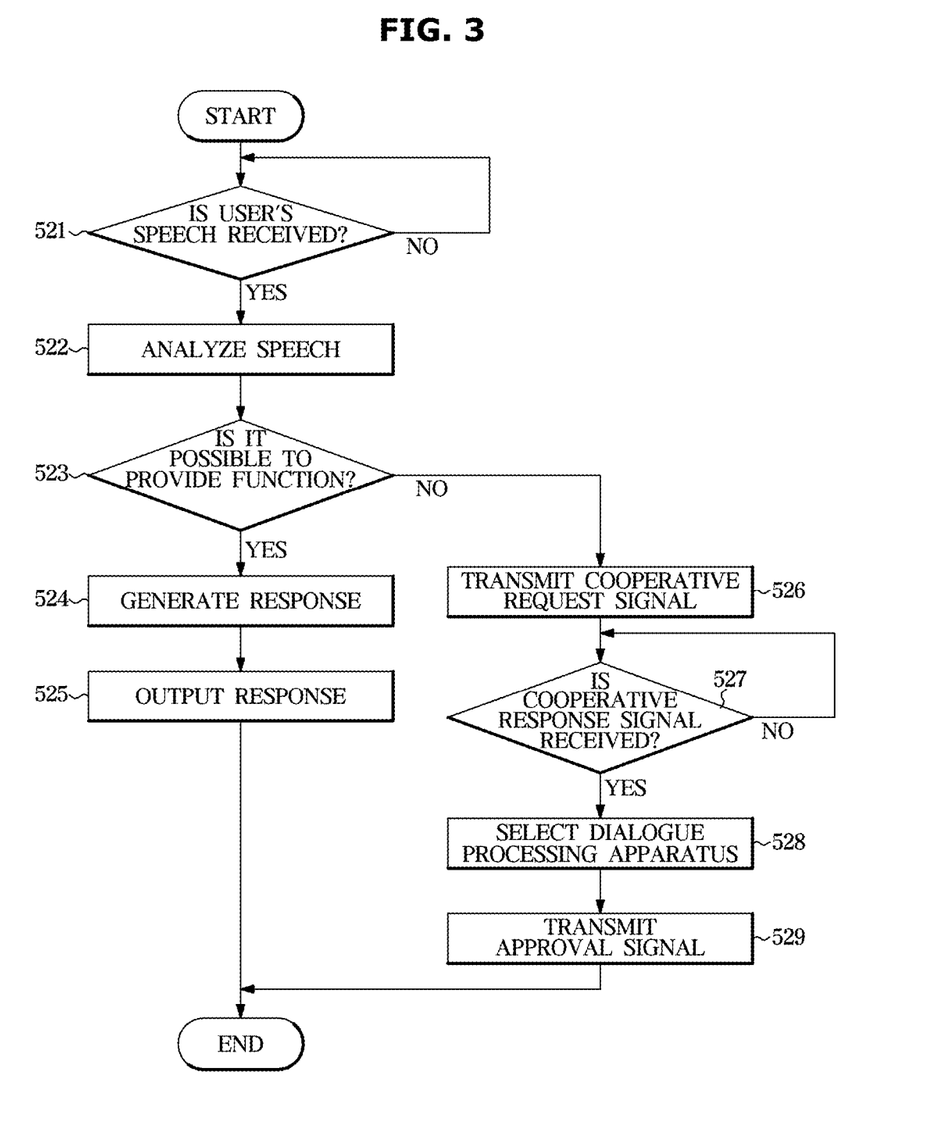
FIG. 3 is a flowchart illustrating a dialogue processing method of a first dialogue processing apparatus of a dialogue processing system according to an embodiment of the disclosure.

FIG. 3 is a flowchart illustrating a dialogue processing method of a first dialogue processing apparatus of a dialogue processing system according to an embodiment of the disclosure.

Referring to FIG. 3, the first dialogue processing apparatus 100 of the dialogue processing system 1 according to an embodiment may determine whether the user's speech is received (521), and when the user's speech is received (YES in 521), the first dialogue processing apparatus 100 may analyze the user's speech (522).

In this case, the operation of analyzing the user's speech may include operations of recognizing the user's speech and identifying the user's intention. The operation of analyzing the user's speech may further include an operation of generating the speech recognition result.

The first controller 150 of the first dialogue processing apparatus 100 may determine whether it is possible to provide the function corresponding to the user's intention (523). When it is possible to provide the function corresponding to the user's intention (YES in 523), the first controller 150 may generate the response corresponding to the user's intention (524) and output the generated response (525). A description of this is the same as FIG. 2.

In another example, when it is impossible to provide the function corresponding to the user's intention (NO in 523), the first controller 150 may transmit a cooperative request signal to at least one of the second dialogue processing apparatus 200 or the third dialogue processing apparatus 300 (526).

The first controller 150 may transmit user's speech information together with the cooperative request signal at least one of the second dialogue processing apparatus 200 or the third dialogue processing apparatus 300. Each of the second dialogue processing apparatus 200 or the third dialogue processing apparatus 300 may determine whether the cooperative request signal has been received (527).

Each of the second dialogue processing apparatus 200 or the third dialogue processing apparatus 300 that has received the cooperation request signal may determine whether it is possible to provide the function corresponding to the user's intention based on the speech information received together with the cooperation request signal.

Alternatively, each of the second dialogue processing apparatus 200 or the third dialogue processing apparatus 300 that has received the cooperative request signal may determine whether it is possible to provide the function corresponding to the user's intention based on the speech information stored in the server 400.

When it is possible to provide the function corresponding to the user's intention, each of the second dialogue processing apparatus 200 or the third dialogue processing apparatus 300 may transmit a cooperative response signal to the first dialogue processing apparatus 100.

When the cooperative response signal corresponding to the cooperative request signal is received from the external apparatus including at least one of the second dialogue processing apparatus 200 or the third dialogue processing apparatus 300, the first controller 150 may select the dialogue processing apparatus for outputting the response to the user (528).

In particular, the first controller 150 may select the dialogue processing apparatus that first transmitted the cooperative response signal as the apparatus for outputting the response to the user.

The first controller 150 may select the apparatus for outputting the response to the user based on the reliability of each of the apparatuses. In this case, the reliability of each of the apparatuses may be determined based on at least one of dialogue processing speed, accuracy, user preference, frequency of use, reception order of the cooperative response signal, or a predetermined priority. The reliability for each of these apparatuses may be stored in advance or received from the external apparatus.

The first controller 150 may transmit an approval signal to the selected apparatus (529), and the apparatus that receives the approval signal may generate and output the response corresponding to the user's speech. At this time, the approval signal may refer to a signal for a control authority for the dialogue processing.

Alternatively, the first controller 150 may select the apparatus that can first provide the function corresponding to the speech information among at least one external apparatus that transmits the cooperative response signal as the apparatus for outputting the response corresponding to the user's speech. The first controller 150 may control the selected apparatus so that the selected apparatus outputs the response corresponding to the speech information and deletes the speech information.

For example, the first controller 150 may detect the second dialogue processing apparatus 200 as the first apparatus capable of providing the function corresponding to the speech information among at least one external apparatus that transmits the response signal corresponding to the cooperative request signal. The first controller 150 may select the second dialogue processing apparatus 200 as the apparatus for outputting the response corresponding to the user's speech. The first controller 150 may transmit the control signal for response output and speech information deletion to the second dialogue processing apparatus 200. The second controller 250 of the second dialogue processing apparatus 200 may output the response corresponding to the speech information and may delete the speech information registered in the server 400.

Even when the function corresponding to the user's speech cannot be provided by the dialogue processing apparatus receiving the user's speech, the user may be provided with the desired service through another dialogue processing apparatus capable of providing the corresponding function. Therefore, the user's convenience may be improved.

In addition, since the user can provide the desired service by the most reliable dialogue processing apparatus, the efficiency of dialogue processing can also be improved.

Figure 4:
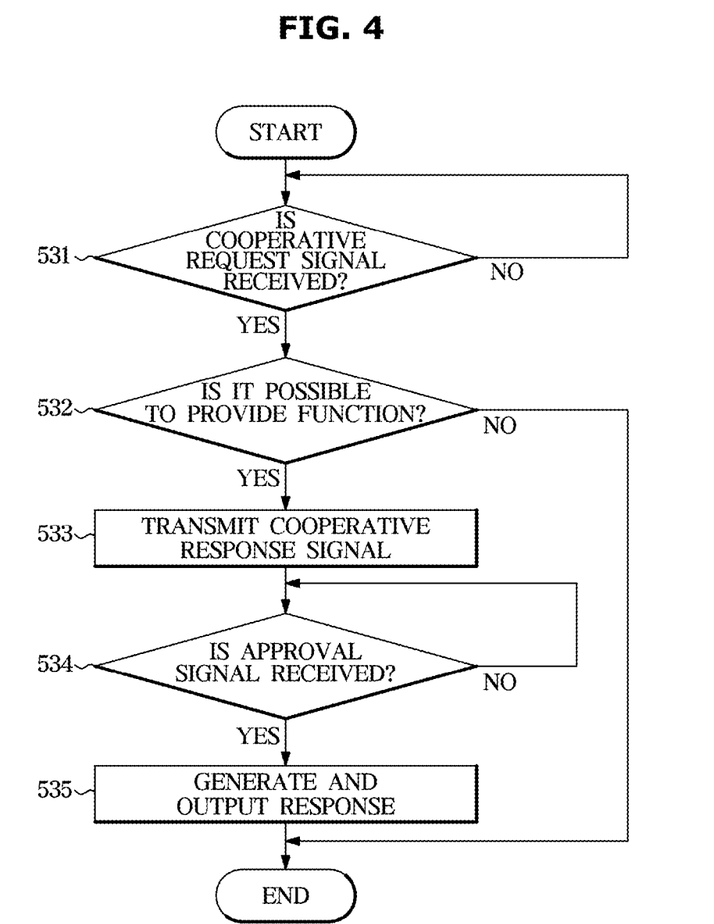
FIG. 4 is a flowchart illustrating a dialogue processing method of a second dialogue processing apparatus of the dialogue processing system according to an embodiment of the disclosure.

FIG. 4 is a flowchart illustrating a dialogue processing method of a second dialogue processing apparatus of the dialogue processing system according to an embodiment of the disclosure.

Referring to FIG. 4, the second dialogue processing apparatus 200 of the dialogue processing system 1 according to an embodiment may determine whether the cooperative request signal is received (531).

When the cooperative request signal is received (YES in 531), the second dialogue processing apparatus 200 may determine whether it is possible to provide the function corresponding to the user's speech (532).

In this case, the second dialogue processing apparatus 200 may receive the stored speech information from the server 400, analyze the user's speech based on the speech information, and identify whether it is possible to provide the function corresponding to the identified user's intention.

Alternatively, when the speech information is received together with the cooperative request signal, the second dialogue processing apparatus 200 may analyze the user's speech based on the speech information and identify whether it is possible to provide the function corresponding to the identified user's intention (532).

When it is possible to provide the function corresponding to the user's intention (YES in 532), the second dialogue processing apparatus 200 may transmit the cooperative response signal to the first dialogue processing apparatus 100 (533).

After transmitting the cooperative response signal, the second dialogue processing apparatus 200 may identify whether the approval signal is received (534). When the approval signal is received (YES in 534), the second dialogue processing apparatus 200 may generate and output the response corresponding to the user's intention (535).

The second dialogue processing apparatus 200 may provide the function suitable for the user instead of the apparatus that cannot provide the function corresponding to the user's speech by sharing the speech information about the user's speech with the external apparatus. Therefore, the user's satisfaction can be improved.

Figure 5:
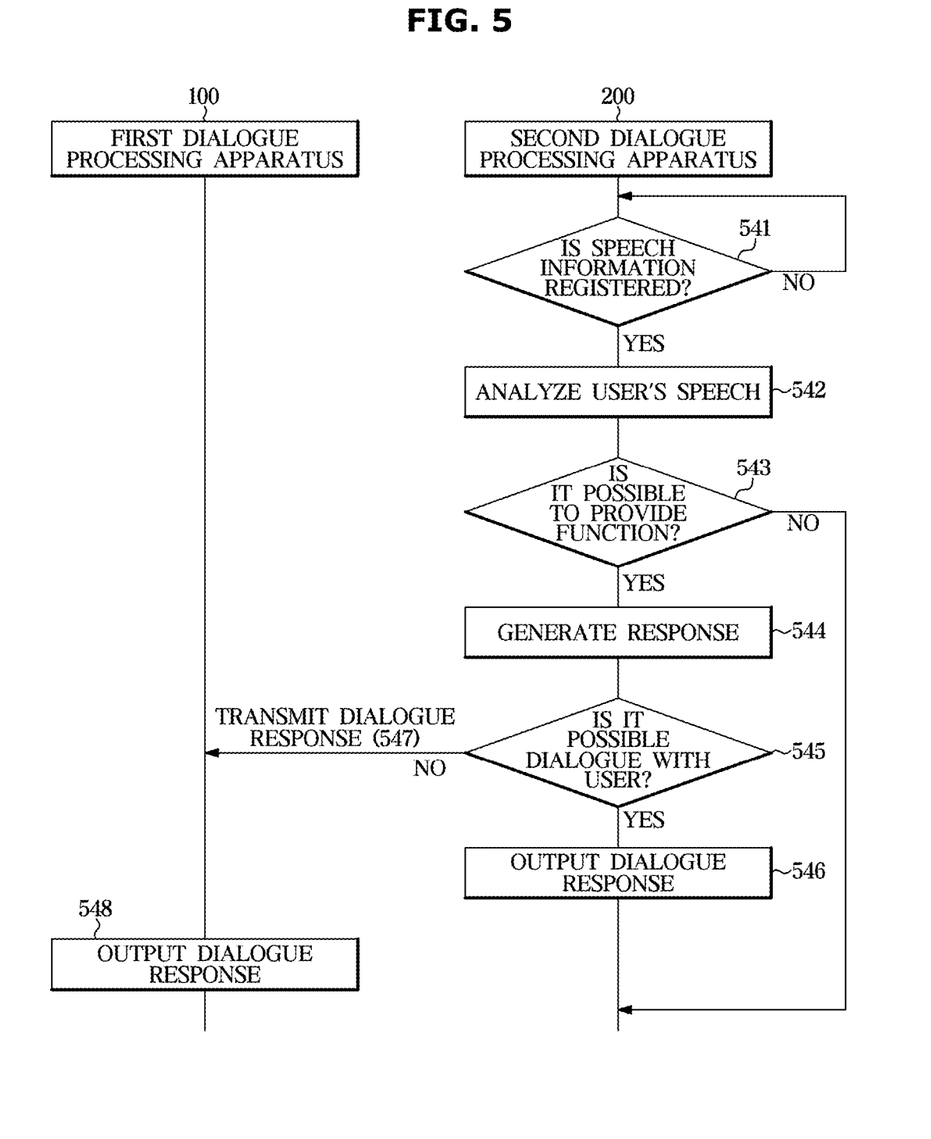
FIG. 5 is a flowchart illustrating a dialogue processing method of a dialogue processing system according to another embodiment of the disclosure.

FIG. 5 is a flowchart illustrating a dialogue processing method of a dialogue processing system according to another embodiment of the disclosure.

Referring to FIG. 5, the second dialogue processing apparatus 200 of the dialogue processing system 1 according to an embodiment may determine whether the speech information is registered in the server 400 (541).

When the speech information is registered in the server 400 (YES in 541), the second controller 250 of the second dialogue processing apparatus 200 may analyze the user's speech (542) and may identify the user's intention based on the speech information. The second control unit 250 may identify whether it is possible to provide the function corresponding to the user's intention (543). When it is possible to provide the function corresponding to the user's intention (YES in 543), the second controller 250 may generate the response corresponding to the user's intention (544).

In this case, the response generated in response to the user's speech may include the dialogue response and further include a command for the associated service function. The dialogue response may be in the form of the initial conversation, the query, or the answer that includes informational provision.

The description of operations 541-544 is the same as the description of operations 508-511 of FIG. 2.

After generating the response (544), the second controller 250 may identify whether the dialogue with the user is possible (545).

In detail, the second controller 250 may compare position information of the second dialogue processing apparatus 200 and position information of the first dialogue processing apparatus 100 that receives the user's speech. The second controller 250 may identify whether the dialogue with the user is possible based on the comparison result.

In this case, the position information may include identification information of a space where each of the apparatuses is located. For example, when both the first dialogue processing apparatus 100 and the second dialogue processing apparatus 200 are located in a living room, the position information of each of the dialogue processing apparatuses may be the same. In another example, when the first dialogue processing apparatus 100 is located in the living room and the second dialogue processing apparatus 200 is located in a study, the position information of each of the dialogue processing apparatuses may be different.

When the position information of the first dialogue processing apparatus 100 and the position information of the second dialogue processing apparatus 200 that receive the user's speech are the same, the second controller 250 may determine that it is possible to talk with the user. When it is identified that the dialogue with the user is possible (YES in 545), the second control unit 250 may output the generated dialogue response through the second outputter 240 (546).

In another example, when the position information of the first dialogue processing apparatus 100 and the position information of the second dialogue processing apparatus 200 that receive the user's speech are different from each other, the second controller 250 may determine that it is impossible to talk with the user. The second controller 250 may transmit the dialogue response among the generated responses to the first dialogue processing apparatus 100 (547).

The first dialogue processing apparatus 100 may output the received dialogue response (548). The second dialogue processing apparatus 100 may provide only a service function excluding the dialogue response among the generated responses. In this case, although the dialogue processing apparatus providing the desired function is located in another space, the user may receive feedback on speech input through the dialogue processing apparatus in the same space. Thus, user's convenience can be improved.

Figure 6:
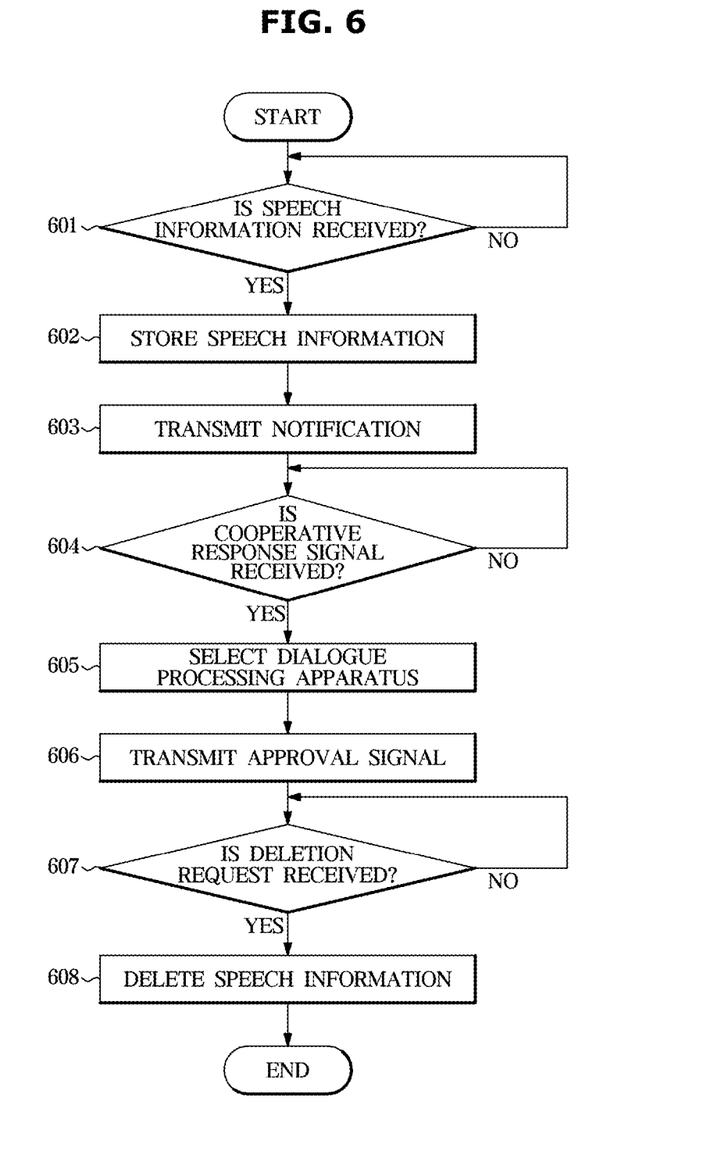
FIG. 6 is a flowchart illustrating an operation of a server according to an embodiment of the disclosure.

FIG. 6 is a flowchart illustrating an operation of a server according to an embodiment of the disclosure.

Referring to FIG. 6, the server 400 may identify whether the speech information is received from the first dialogue processing apparatus 100 (601), and when the speech information is received (YES in 601), the server 400 may store the speech information (602).

When the speech information is stored, in other words, when the speech information is registered, the server 400 may transmit a notification for registering the speech information to at least one of the second dialogue processing apparatus 200 or the third dialogue processing apparatus 300 (603).

Thereafter, the server 400 may identify whether the cooperative response signal corresponding to the notification is received (604). When the cooperative response signal is received (YES in 604), the server 400 may select the dialogue processing apparatus to output the response corresponding to the user's intention (605).

In detail, the server controller 420 of the server 400 may select the dialogue processing apparatus that first transmitted the cooperative response signal as the apparatus for outputting the response to the user.

Alternatively, the server controller 420 may select the dialogue processing apparatus to output the response to the user based on the reliability of each of the dialogue processing apparatuses. In this case, the reliability of each of the dialogue processing apparatuses may be determined based on at least one of dialogue processing speed, accuracy, user preference, frequency of use, reception order of the cooperative response signal, or the predetermined priority.

The server controller 420 may transmit the approval signal to the selected dialogue processing apparatus to output the response (606). The dialogue processing apparatus that receives the approval signal may generate and output the response corresponding to the user's speech. At this time, the approval signal may refer to the signal for the control authority for the dialogue processing.

Thereafter, the server 400 may identify whether the deletion request for the speech information is received from the dialogue processing apparatus that completes output of the response corresponding to the user's speech (607). When the deletion request for the speech information is received (YES in 607), the server 400 may delete the stored speech information (608).

When the output of the response to the user is completed, since the speech information registered in the server 400 is deleted, it is possible to prevent the duplicate response provided by another dialogue processing apparatus. Therefore, efficient dialogue processing is possible, and user's convenience can be improved.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

As is apparent from the above, according to the dialogue processing apparatus, the dialogue processing system including the same, and the dialogue processing method, even when a function corresponding to the user's speech cannot be provided by the dialogue processing apparatus receiving the user's speech, the user may be provided with the desired service through another dialogue processing apparatus capable of providing the corresponding function. Therefore, the user's convenience can be improved.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example and should not be interpreted in a limited sense.

What is claimed is:

1. A dialogue processing apparatus comprising:
a communicator configured to communicate with an external apparatus;

a speech input unit configured to receive a speech of a user; and a controller configured, when the speech of the user is received, to determine whether it is possible to provide a function corresponding to the received speech, and to control the communicator to transmit speech information about the speech of the user to the external apparatus based on whether it is possible to provide the function corresponding to the received speech, wherein when the function corresponding to the received speech of the user is provided, the external apparatus is configured to generate a response corresponding to the speech information, to output the generated response, to compare position information of the dialogue processing apparatus with position information of the external apparatus, and to transmit a dialogue response among the generated responses to the dialogue processing apparatus based on the comparison result.

2. The dialogue processing apparatus according to claim 1, wherein, when it is impossible to provide the function corresponding to the received speech, the controller is configured to control the communicator to transmit the speech information about the speech of the user to the external apparatus, and to store the speech information in the external apparatus.

3. The dialogue processing apparatus according to claim 1, wherein the speech information comprises sound data for the speech of the user, a speech recognition result for the speech of the user, and context information.

4. The dialogue processing apparatus according to claim 1,
wherein, when it is impossible to provide the function corresponding to the received speech, the controller is configured to control the communicator to transmit a cooperative request signal to the external apparatus.

5. The dialogue processing apparatus according to claim 4, wherein the controller is configured to transmit a deletion request for the speech information to the external apparatus when the generated response is output.

6. The dialogue processing apparatus according to claim 4, wherein, when a cooperative response signal corresponding to the cooperative request signal is received, the controller is configured to control the communicator to transmit the speech information to the external apparatus that transmitted the cooperative response signal.

7. The dialogue processing apparatus according to claim 6, wherein, when the cooperative response signal is received from the at least one external apparatus, the controller is configured to select an apparatus for outputting a response corresponding to the speech of the user among the at least one external apparatus that transmits the cooperative response signal, and to transmit an approval signal related to the output of a response corresponding to a speech signal to the selected apparatus.

8. The dialogue processing apparatus according to claim 6, wherein the controller is configured to select an apparatus capable of first providing a function corresponding to the speech information among the at least one external apparatus that transmits the cooperative response signal as an apparatus for outputting a response corresponding to the speech of the user, and to control the selected apparatus such that the selected apparatus outputs the response corresponding to the speech information and deletes the speech information.

9. The dialogue processing apparatus according to claim 7, wherein the controller is configured to select an apparatus for outputting the response corresponding to the speech of the user among the at least one external apparatus that transmits the cooperative response signal, based on at least one of dialogue processing speed, accuracy, user preference, frequency of use, reception order of the cooperative response signal, or a predetermined priority.

10. The dialogue processing apparatus according to claim 1, further comprising:
an output unit,
wherein the controller is configured to:
when it is possible to provide the function corresponding to the received speech, generate the response corresponding to the speech of the user and control the output unit to output the generated response; and
when the generated response is output, transmit a deletion request for the speech information to the external apparatus.

11. A server comprising:
a server communicator configured to communicate with at least one dialogue processing apparatus;
a server storage; and
a server controller configured to:
when speech information about a speech of a user is received from the at least one dialogue processing apparatus, store the received speech information in the server storage;
when a deletion request for the speech information is received from the at least one dialogue processing apparatus, delete the speech information stored in the server storage;
when a function corresponding to the speech information is provided, control another dialogue processing apparatus to generate a response corresponding to the speech information and to output the generated response; and
control the other dialogue processing apparatus to transmit a dialogue response among the generated responses to the at least one dialogue processing apparatus based on a comparison between position information of the at least one dialog processing apparatus and position information of the other dialog processing apparatus.

12. The server according to claim 11, wherein the server controller is configured to control the server communicator to transmit a notification message for the speech information to the at least one dialogue processing apparatus when the speech information is received.

13. A dialogue processing system comprising:
a server configured to communicate with at least one external apparatus;
a first dialogue processing apparatus configured to:
receive a speech of a user;
identify an intention of the user corresponding to the received speech;
determine whether it is possible to provide a function corresponding to the intention of the user; and
register speech information about the speech of the user with the server based on whether it is possible to provide a function corresponding to the received speech; and
a second dialogue processing apparatus configured to:
when the speech information is registered in the server, determine whether it is possible to provide a function corresponding to the intention of the user; and
generate a response corresponding to the speech information based on whether it is possible to provide the function corresponding to the intention of the user and output the generated response, wherein, when the function corresponding to the intention of the user is provided, the second dialogue processing apparatus is configured to generate a response corresponding to the speech information, and to output the generated response,
   wherein the second dialogue processing apparatus is configured to compare position information of the first dialogue processing apparatus with position information of the second dialogue processing apparatus, and to transmit a dialogue response among the generated responses to the first dialogue processing apparatus based on the comparison result.

14. The dialogue processing system according to claim 13, wherein, when it is impossible to provide a function corresponding to the received speech, the first dialogue processing apparatus is configured to transmit speech information about the speech of the user to the server, and
   wherein the server is configured to register the speech information by storing the speech information received from the first dialogue processing apparatus.

15. The dialogue processing system according to claim 13, wherein, when the generated response is output, the second dialogue processing apparatus is configured to transmit a deletion request of the speech information to the server, and
   wherein the server is configured to delete the stored speech information based on the deletion request.

16. The dialogue processing system according to claim 13, wherein the speech information comprises at least one of sound signal data corresponding to the speech of the user and a speech recognition result generated by the first dialogue processing apparatus.

17. The dialogue processing system according to claim 13, wherein, when it is impossible to provide the function corresponding to the received speech, the first dialogue processing apparatus is configured to control the communicator to transmit a cooperative request signal to the at least one external apparatus.

18. The dialogue processing system according to claim 17, wherein, when a cooperative response signal corresponding to the cooperative request signal is received from the at least one external apparatus, the first dialogue processing apparatus is configured to select an apparatus for outputting a response corresponding to the speech of the user among the at least one external apparatus that transmits the cooperative response signal, and to transmit an approval signal related to the output of a response corresponding to a speech signal to the selected apparatus.

19. The dialogue processing system according to claim 17, wherein, when an external apparatus capable of first providing a function corresponding to the speech information among the at least one external apparatus that transmits a cooperative response signal corresponding to the cooperative request signal is the second dialogue processing apparatus, the first dialogue processing apparatus is configured to select the second dialogue processing apparatus as an apparatus for outputting a response corresponding to the speech of the user, and
   wherein the second dialogue processing apparatus is configured to output the response corresponding to the speech information, and to delete the speech information from the server.

20. The dialogue processing system according to claim 18, wherein the first dialogue processing apparatus is configured to select an apparatus for outputting the response corresponding to the speech of the user among the at least one external apparatus that transmits the cooperative response signal, based on at least one of a dialogue processing speed, accuracy, user preference, frequency of use, reception order of the cooperative response signal, or a predetermined priority.

21. A dialogue processing method comprising:
   receiving a speech of a user through a first dialogue processing apparatus;
   identifying, by the first dialogue processing apparatus, an intention of the user corresponding to the received speech and determining whether it is possible to provide a function corresponding to the intention of the user by the first dialogue processing apparatus;
   registering, by the first dialogue processing apparatus, speech information about the speech of the user with a server based on whether it is possible to provide a function corresponding to the received speech by the first dialogue processing apparatus;
   when the speech information is registered in the server, generating, by a second dialogue processing apparatus, a response corresponding to the speech information based on whether it is possible to provide a function corresponding to the speech information;
   outputting, by the second dialogue processing apparatus, the generated response; and
   comparing, by the second dialogue processing apparatus, position information of the first dialogue processing apparatus with position information of the second dialogue processing apparatus, and transmitting, by the second dialogue processing apparatus, a dialogue response among the generated responses to the first dialogue processing apparatus based on the comparison result.

* * * * *